United States Patent
Li et al.

(10) Patent No.: US 10,764,925 B2
(45) Date of Patent: Sep. 1, 2020

(54) COORDINATION OF WIRELESS NODES FOR DATA TRANSMISSIONS IN OVERLAPPING BASIC SERVICE SETS

(71) Applicant: Huawei Technologies Co., Ltd., Shenzhen (CN)

(72) Inventors: Bo Li, Xi'an (CN); Mao Yang, Xi'an (CN); Xiao Han, Shenzhen (CN); Meilu Lin, Shenzhen (CN); Yuchen Guo, Shenzhen (CN); Xun Zhou, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 16/051,746

(22) Filed: Aug. 1, 2018

(65) Prior Publication Data

US 2018/0343677 A1 Nov. 29, 2018

Related U.S. Application Data

(63) Continuation of application No. PCT/CN2016/111183, filed on Dec. 20, 2016.

(30) Foreign Application Priority Data

Feb. 2, 2016 (CN) .......................... 2016 1 0073993
Jul. 20, 2016 (CN) .......................... 2016 1 0575903

(51) Int. Cl.
*H04W 74/08* (2009.01)
*H04W 24/02* (2009.01)
*H04L 12/24* (2006.01)
*H04W 48/08* (2009.01)
*H04W 84/12* (2009.01)

(52) U.S. Cl.
CPC ..... *H04W 74/0808* (2013.01); *H04L 41/0803* (2013.01); *H04W 24/02* (2013.01); *H04W 48/08* (2013.01); *H04W 84/12* (2013.01)

(58) Field of Classification Search
CPC . H04W 74/0808; H04W 48/08; H04W 24/02; H04W 84/12; H04W 74/002; H04W 24/00; H04L 41/0803; H04B 17/382; H04B 17/309
See application file for complete search history.

(56) References Cited

U.S. PATENT DOCUMENTS 9,565,567 B2 *  2/2017  Chaves ............. H04W 74/0808
10,129,900 B2 * 11/2018  Park ...................... H04W 48/16
10,314,011 B2 *  6/2019  Matsuo ............. H04W 72/0406
(Continued)

FOREIGN PATENT DOCUMENTS

CA          2933033 A1    6/2015
CN       101583158 A     11/2009
(Continued)

*Primary Examiner* — Ian N Moore
*Assistant Examiner* — Rushil Parimal Sampat
(74) *Attorney, Agent, or Firm* — Slater Matsil, LLP

(57) ABSTRACT

An information transmission method, including receiving, by a first node, a request message sent by a second node, where the first node and the second node belong to a same basic service set (BSS), and sending, by the first node, a response message to the second node, where the response message comprises an identifier of a BSS to which the first node belongs.

8 Claims, 12 Drawing Sheets

(56) References Cited

U.S. PATENT DOCUMENTS

| | | | |
|---|---|---|---|
| 2010/0138549 A1 | 6/2010 | Goel et al. | |
| 2013/0336182 A1 | 12/2013 | Asterjadhi et al. | |
| 2014/0119303 A1 | 5/2014 | Kwon et al. | |
| 2015/0312386 A1 | 10/2015 | Lee et al. | |
| 2015/0373580 A1 | 12/2015 | Xing et al. | |
| 2016/0205615 A1 | 7/2016 | Seok | |
| 2018/0248646 A1* | 8/2018 | Wikstrom | H04L 25/00 |

FOREIGN PATENT DOCUMENTS

| | | |
|---|---|---|
| CN | 103052077 A | 4/2013 |
| CN | 104113905 A | 10/2014 |
| CN | 104735676 A | 6/2015 |
| CN | 104956735 A | 9/2015 |

\* cited by examiner

| Preamble | Service field | MAC header | Data payload | Frame check sequence |

COORDINATION OF WIRELESS NODES FOR DATA TRANSMISSIONS IN OVERLAPPING BASIC SERVICE SETS

CROSS-REFERENCE TO RELATED APPLICATIONS

This application is a continuation of International Application No. PCT/CN2016/111183, filed on Dec. 20, 2016, which claims priority to Chinese Patent Application No. 201610073993.4, filed on Feb. 2, 2016 and Chinese Patent Application No. 201610575903.1, filed on Jul. 20, 2016. The disclosures of the aforementioned applications are hereby incorporated by reference in their entireties.

TECHNICAL FIELD

Embodiments of the present invention relate to communications technologies, and in particular, to an information transmission method and a node.

BACKGROUND

A wireless local area network (WLAN) technology has become one of major network access technologies because of its advantages of a high rate and low costs.

In a WLAN system, before transmitting data on a channel, a node needs to perform channel assessment on the channel based on a clear channel assessment (CCA) threshold. The node can transmit data on the channel if a result of the channel assessment is that the channel is idle. In a dense deployment scenario, coverage areas of a plurality of basic service sets (BSS) may overlap to form an overlapping basic service set (OBSS). A node in the OBSS can receive, on one channel, both a signal sent by another node in a BSS to which the node belongs and a signal sent by another node in the OBSS. In other words, a node in the OBSS can receive signals sent by nodes in different BSSs. If the node uses a same CCA threshold to perform channel assessment on signals that are sent by nodes in different BSSs and received on a channel, the channel assessment may be inaccurate. As a result, data transmission efficiency and a network throughput in the WLAN system are relatively low.

Therefore, it is extremely important to differentiate signals that are sent by nodes in different BSSs and received by a node.

SUMMARY

Embodiments of the present invention provide an information transmission method and a node, so that a node differentiates BSSs to which nodes that send messages received by the node belong.

Embodiment 1 of the present invention provides an information transmission method, including receiving, by a first node, a request message sent by a second node, where the first node and the second node belong to a same BSS, and sending, by the first node, a response message to the second node, where the response message includes an identifier of a BSS to which the first node belongs.

Optionally, the identifier of the BSS to which the first node belongs includes a BSS color, and the identifier of the BSS to which the first node belongs is located in a duration field of the response message.

Optionally, the identifier of the BSS to which the first node belongs is located at a preset bit in the duration field of the response message.

Optionally, the response message further includes carried indication information, and the carried indication information is used to indicate, to a third node, that the identifier of the BSS to which the first node belongs exists at the preset bit in the duration field of the response message.

Optionally, a result of comparing duration corresponding to the duration field of the response message with a preset threshold is used to indicate, to a third node, that the identifier of the BSS to which the first node belongs exists at the preset bit in the duration field of the response message.

Optionally, duration corresponding to a duration field of the request message is first duration, the first duration is duration determined by the second node based on the duration corresponding to the duration field of the to-be-received response message, a SIFS, and preset response-message transmission duration, the preset bit in the duration field of the to-be-received response message includes an identifier of a BSS to which the second node belongs, and before the sending, by the first node, a response message to the second node, the method further includes determining, by the first node, second duration based on the first duration, the SIFS, and the preset response-message transmission duration, where the duration corresponding to the duration field of the response message is the second duration.

Optionally, before the determining, by the first node, second duration based on the first duration, the SIFS, and the preset response-message transmission duration, the method may further include determining, by the first node, the preset response-message transmission duration based on a preset transmission rate.

Optionally, the preset transmission rate is any one of a primary rate of the first node, a rate corresponding to an MCS of the first node, and a rate corresponding to an MCS of the second node, and the MCS of the second node may be determined by the first node based on the request message.

Optionally, before the sending, by the first node, a response message to the second node, the method may further include configuring, by the first node at the preset bit in the duration field of the response message, the identifier of the BSS to which the first node belongs, and configuring, by the first node, another bit in the duration field of the response message based on preset duration, so that the duration corresponding to the duration field of the response message is greater than or equal to the preset duration.

An embodiment of the present invention further provides another information transmission method, including listening, by a third node, to a response message sent by a first node to a second node, where the response message includes an identifier of a BSS to which the first node belongs, and the first node and the second node belong to a same BSS, determining, by the third node based on the response message, the identifier of the BSS to which the first node belongs, and determining, by the third node based on the identifier of the BSS to which the first node belongs and an identifier of a BSS to which the third node belongs, whether the first node and the third node belong to a same BSS.

Optionally, the determining, by the third node based on the identifier of the BSS to which the first node belongs and an identifier of a BSS to which the third node belongs, whether the first node and the third node belong to a same BSS may include comparing, by the third node, the identifier of the BSS to which the first node belongs with the identifier of the BSS to which the third node belongs, and if the identifier of the BSS to which the first node belongs is different from the identifier of the BSS to which the third node belongs, determining, by the third node, that the first node and the third node belong to different BSSs.

Optionally, the identifier of the BSS to which the first node belongs includes a BSS color, and the determining, by the third node based on the response message, the identifier of the BSS to which the first node belongs includes determining, by the third node based on a duration field of the response message, the identifier of the BSS to which the first node belongs.

Optionally, the determining, by the third node based on a duration field of the response message, the identifier of the BSS to which the first node belongs includes determining, by the third node based on a preset bit in the duration field of the response message, the identifier of the BSS to which the first node belongs.

Optionally, the response message further includes carried indication information, and the determining, by the third node based on a preset bit in the duration field of the response message, the identifier of the BSS to which the first node belongs includes determining, by the third node based on the carried indication information, whether the identifier of the BSS to which the first node belongs exists at the preset bit in the duration field of the response message, and if the identifier of the BSS to which the first node belongs exists at the preset bit, determining, by the third node based on the preset bit in the duration field of the response message, the identifier of the BSS to which the first node belongs.

Optionally, the determining, by the third node based on a preset bit in the duration field of the response message, the identifier of the BSS to which the first node belongs may include determining, by the third node based on a result of comparing duration corresponding to the duration field of the response message with a preset threshold, whether the identifier of the BSS to which the first node belongs exists at the preset bit in the duration field of the response message, and if the identifier of the BSS to which the first node belongs exists at the preset bit, determining, by the third node based on the preset bit in the duration field of the response message, the identifier of the BSS to which the first node belongs.

Optionally, the duration corresponding to the duration field of the response message is second duration, the second duration is determined by the first node based on first duration, a SIFS, and preset transmission duration, the first duration is duration corresponding to a duration field of a request message that is sent by the second node to the first node, the first duration is duration determined by the second node based on the duration corresponding to the duration field of the to-be-received response message, the SIFS, and the preset transmission duration, and the preset bit in the duration field of the to-be-received response message includes an identifier of a BSS to which the second node belongs.

Optionally, the preset transmission duration is determined by the first node based on a preset transmission rate, the preset transmission rate is any one of a primary rate of the first node, a rate corresponding to an MCS of the first node, and a rate corresponding to an MCS of the second node, and the MCS of the second node may be determined based on the request message.

Optionally, the duration corresponding to the duration field of the response message is greater than or equal to preset duration and is obtained after the first node configures, at the preset bit, the identifier of the BSS to which the first node belongs and configures another bit in the duration field of the response message based on the preset duration.

Optionally, the method may further include if the first node and the third node belong to different BSSs, determining, by the third node, a CCA threshold corresponding to an OBSS, where the CCA threshold corresponding to the OBSS is greater than or equal to a CCA threshold corresponding to the BSS to which the third node belongs, performing, by the third node, channel assessment based on the CCA threshold corresponding to the OBSS, and transmitting, by the third node, a message on a channel if a result of the channel assessment is that the channel is idle.

Optionally, the response message further includes SR indication information, and the transmitting, by the third node, a message on a channel if a result of the channel assessment is that the channel is idle includes transmitting, by the third node, the message on the channel if the result of the channel assessment is that the channel is idle and if the SR indication information is allowance indication information.

An embodiment of the present invention further provides a node, where the node is a first node, and includes a receiver and a transmitter, the receiver is configured to receive a request message sent by a second node, where the first node and the second node belong to a same BSS, and the transmitter is configured to send a response message to the second node, where the response message includes an identifier of a BSS to which the first node belongs.

Optionally, the identifier of the BSS to which the first node belongs includes a BSS color, and the identifier of the BSS to which the first node belongs is located in a duration field of the response message.

Optionally, the identifier of the BSS to which the first node belongs is located at a preset bit in the duration field of the response message.

Optionally, the response message further includes carried indication information, and the carried indication information is used to indicate, to a third node, that the identifier of the BSS to which the first node belongs exists at the preset bit in the duration field of the response message.

Optionally, a result of comparing duration corresponding to the duration field of the response message with a preset threshold is used to indicate, to a third node, that the identifier of the BSS to which the first node belongs exists at the preset bit in the duration field of the response message.

Optionally, duration corresponding to a duration field of the request message is first duration, the first duration is duration determined by the second node based on the duration corresponding to the duration field of the to-be-received response message, a SIFS, and preset response-message transmission duration, the preset bit in the duration field of the to-be-received response message includes an identifier of a BSS to which the second node belongs, the node may further include a processor, and the processor is configured to determine second duration based on the first duration, the SIFS, and the preset response-message transmission duration, where the duration corresponding to the duration field of the response message is the second duration.

Optionally, the processor is further configured to determine the preset response-message transmission duration based on a preset transmission rate.

Optionally, the processor is further configured to configure, at the preset bit in the duration field of the response message, the identifier of the BSS to which the first node belongs, and configure another bit in the duration field of the response message based on preset duration, so that the duration corresponding to the duration field of the response message is greater than or equal to the preset duration.

An embodiment of the present invention further provides a node, where the node is a third node, and may include a receiver and a processor, the receiver is configured to listen to a response message sent by a first node to a second node, where the response message includes an identifier of a BSS to which the first node belongs, and the first node and the second node belong to a same BSS, and the processor is configured to determine, based on the response message, the identifier of the BSS to which the first node belongs, and determine, based on the identifier of the BSS to which the first node belongs and an identifier of a BSS to which the third node belongs, whether the first node and the third node belong to a same BSS.

Optionally, the processor is further configured to compare the identifier of the BSS to which the first node belongs with the identifier of the BSS to which the third node belongs, and if the identifier of the BSS to which the first node belongs is different from the identifier of the BSS to which the third node belongs, determine that the first node and the third node belong to different BSSs.

Optionally, the identifier of the BSS to which the first node belongs includes a BSS color, and the processor is further configured to determine, based on a duration field of the response message, the identifier of the BSS to which the first node belongs.

Optionally, the processor is further configured to determine, based on a preset bit in the duration field of the response message, the identifier of the BSS to which the first node belongs.

Optionally, the response message further includes carried indication information, and the processor is further configured to determine, based on the carried indication information, whether the identifier of the BSS to which the first node belongs exists at the preset bit in the duration field of the response message, and if the identifier of the BSS to which the first node belongs exists at the preset bit, determine, based on the preset bit in the duration field of the response message, the identifier of the BSS to which the first node belongs.

Optionally, the processor is further configured to determine, based on a result of comparing duration corresponding to the duration field of the response message with a preset threshold, whether the identifier of the BSS to which the first node belongs exists at the preset bit in the duration field of the response message, and if the identifier of the BSS to which the first node belongs exists at the preset bit, determine, based on the preset bit in the duration field of the response message, the identifier of the BSS to which the first node belongs.

According to the information transmission method and the node that are provided in the embodiments of the present invention, after receiving the request message sent by the second node that belongs to the same BSS as the first node, the first node sends the response message to the second node. The response message includes the identifier of the BSS to which the first node belongs, so that the third node can determine, based on the listened and detected response message, the identifier of the BSS to which the first node belongs, and determine, based on the identifier of the BSS to which the first node belongs and the identifier of the BSS to which the third node belongs, whether the first node and the third node belong to a same BSS. In other words, according to the method, the third node can differentiate BSSs to which nodes that send listened and detected signals belong, so as to perform channel assessment based on a differentiation result by using a corresponding CCA threshold. In this way, channel assessment accuracy, data transmission efficiency, and a network throughput are improved.

BRIEF DESCRIPTION OF THE DRAWINGS

To describe the technical solutions in embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1A:
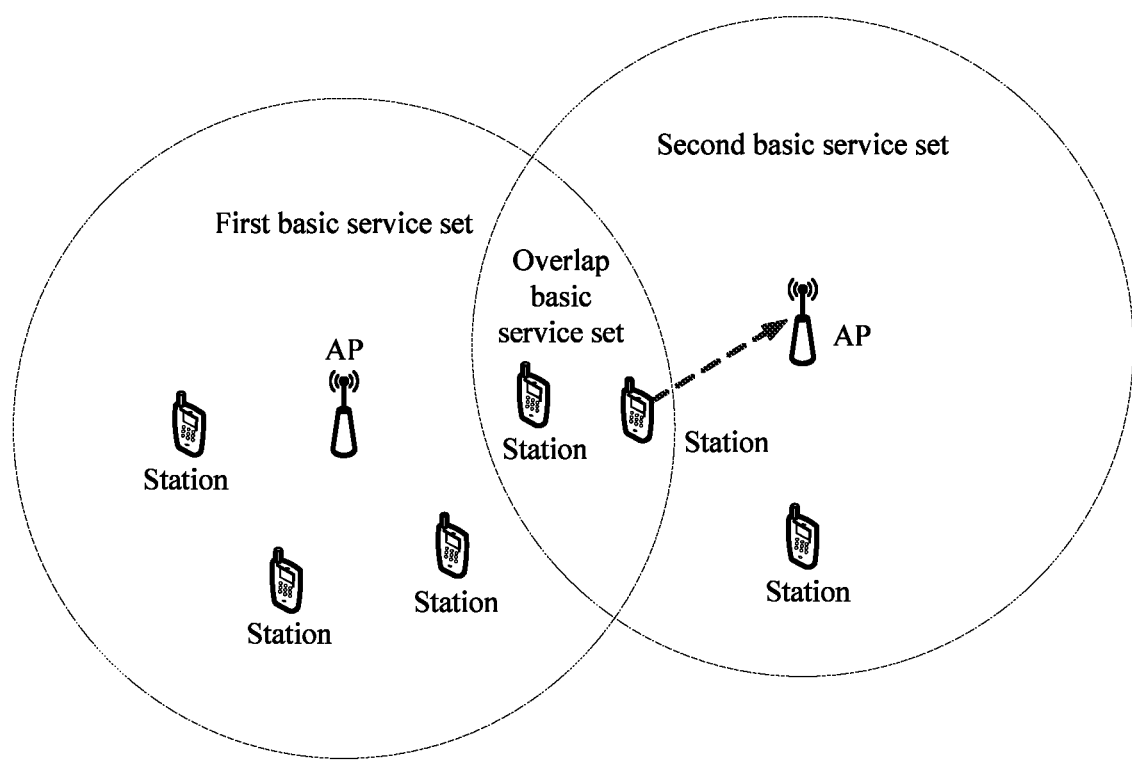
FIG. 1A is an architectural diagram of a network system to which information transmission methods according to embodiments of the present invention are applicable.

An information transmission method provided in the embodiments of the present invention is applicable to a WLAN system, and in particular, to a WLAN system in a dense deployment scenario. The information transmission method provided in the embodiments of the present invention can be applicable to nodes in two adjacent BSSs in a WLAN system in a dense deployment scenario. FIG. 1A is an architectural diagram of a network system to which information transmission methods according to embodiments of the present invention are applicable. As shown in FIG. 1A, the network system may include two adjacent BSSs: a first BSS and a second BSS. Each BSS includes one AP and at least one station. Coverage areas of the first BSS and the second BSS overlap, so that an OBSS is formed. A station in the OBSS can receive both a signal sent by another node in a BSS to which the station belongs and a signal sent by another node in the OBSS. That is, a station in the OBSS can receive a signal sent by a node in the first BSS and a signal sent by a node in the second BSS. According to the information transmission method provided in the embodiments of the present invention, a node in the OBSS can differentiate received signals sent by nodes in different BSSs, so as to perform channel assessment by using a corresponding CCA threshold. In this way, channel assessment accuracy, data transmission efficiency, and a network throughput are improved.

Figures 1B, 2:
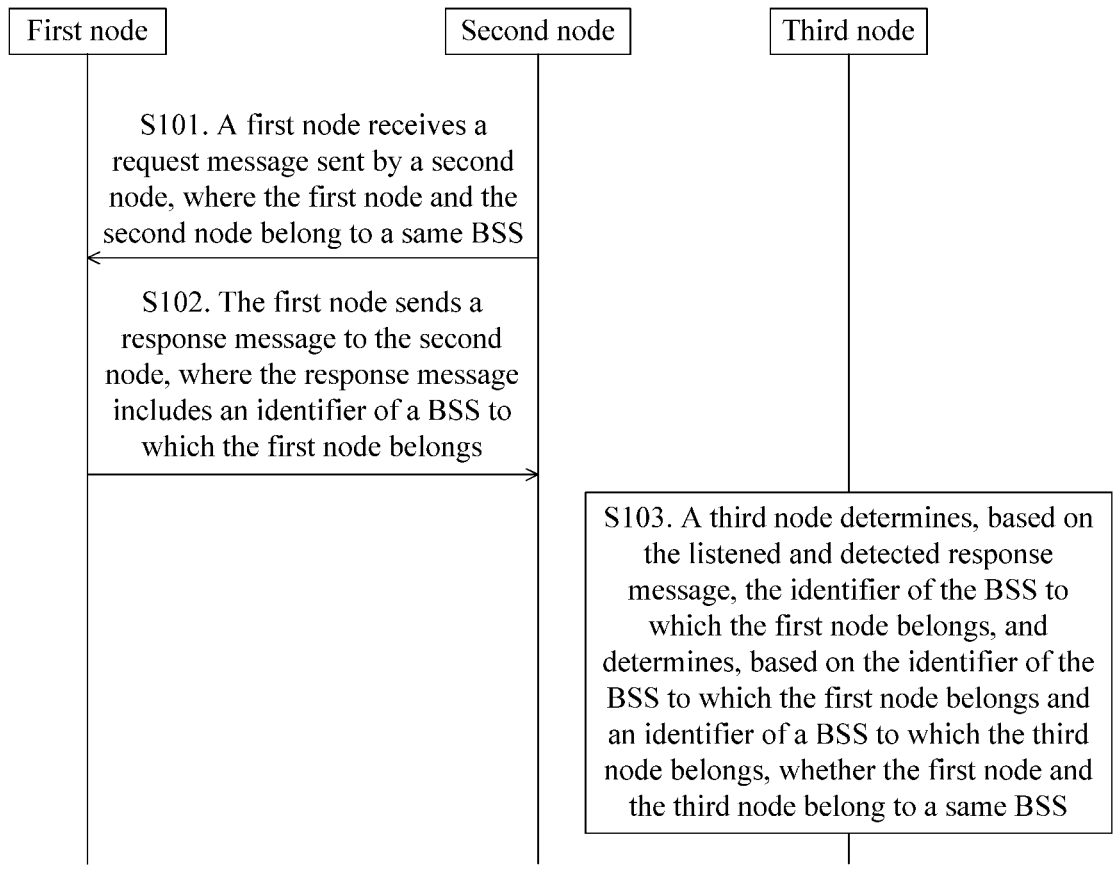
FIG. 1B is a flowchart of an information transmission method according to Embodiment 1 of the present invention.
FIG. 2 is a schematic structural diagram of a wireless local area network frame according to Embodiment 2 of the present invention.

Embodiment 1 of the present invention provides an information transmission method. The method may be performed by a node, and the node may be a station (station, STA for short) or an access point (Access Point, AP for short). FIG. 1B is a flowchart of an information transmission method according to Embodiment 1 of the present invention. As shown in FIG. 1B, the method may include the following steps.

S101. A first node receives a request message sent by a second node, where the first node and the second node belong to a same BSS.

Specifically, the second node sends the request message to the first node when the second node needs to transmit data to the first node. For example, the second node may be a station, and the first node may be a station or an AP. If both the first node and the second node are stations, the information transmission method can be applicable to a device-to-device (Device-To-Device, D2D for short) transmission scenario.

S102. The first node sends a response message to the second node, where the response message includes an identifier of a BSS to which the first node belongs.

Specifically, after receiving the request message, the first node may indicate transmission duration for subsequent interaction to the second node by using the response message. In other words, in addition to the identifier of the BSS to which the first node belongs, the response message may include duration indicated by the first node.

The first node and the second node belong to the same BSS, therefore, the identifier of the BSS to which the first node belongs is the same as an identifier of a BSS to which the second node belongs.

S103. A third node determines, based on the listened and detected response message, the identifier of the BSS to which the first node belongs, and determines, based on the identifier of the BSS to which the first node belongs and an identifier of a BSS to which the third node belongs, whether the first node and the third node belong to a same BSS.

Specifically, the third node may listen and detect the response message sent by the first node to the second node, so that the third node and the first node may belong to a same BSS, or the third node and the first node may belong to different BSSs of an OBSS.

For example, the third node may compare the identifier of the BSS to which the first node belongs with the identifier of the BSS to which the third node belongs. If the identifier of the BSS to which the first node belongs is different from the identifier of the BSS to which the third node belongs, the third node determines that the third node and the first node belong to different BSSs of the OBSS, if the identifier of the BSS to which the first node belongs is the same as the identifier of the BSS to which the third node belongs, the third node determines that the third node and the first node belong to a same BSS.

If the third node determines that the first node and the third node belong to the same BSS, the third node may further perform channel assessment based on a CCA threshold corresponding to the BSS to which the third node belongs, if the third node determines that the first node and the third node belong to different BSSs of the OBSS, the third node may further perform channel assessment based on a CCA threshold corresponding to the OBSS.

According to the information transmission method provided in Embodiment 1 of the present invention, after receiving the request message sent by the second node that belongs to the same BSS as the first node, the first node sends the response message to the second node. The response message includes the identifier of the BSS to which the first node belongs, so that the third node can determine, based on the listened and detected response message, the identifier of the BSS to which the first node belongs, and determine, based on the identifier of the BSS to which the first node belongs and the identifier of the BSS to which the third node belongs, whether the first node and the third node belong to a same BSS. In other words, according to the method, the third node can differentiate BSSs to which nodes that send listened and detected signals belong, so as to perform channel assessment based on a differentiation result by using a corresponding CCA threshold. In this way, channel assessment accuracy, data transmission efficiency, and a network throughput are improved.

Optionally, the identifier of the BSS to which the first node belongs may be located in a Media Access Control (Media Access Control, MAC for short) header of the response message.

Specifically, the response message may be in a form of a wireless local area network frame. FIG. 2 is a schematic structural diagram of a wireless local area network frame according to Embodiment 2 of the present invention. As shown in FIG. 2, the wireless local area network frame mainly includes a preamble (Preamble), a service field, a MAC header, a data payload, and a frame check sequence (Frame Check Sequence, FCS for short). If the identifier of the BSS to which the first node belongs is located in a MAC header of the response message, the identifier of the BSS to which the first node belongs may be carried in an idle field or a reusable field in the MAC header. It should be noted that the identifier of the BSS to which the first node belongs may alternatively be carried in a newly-added field of the wireless local area network frame of the response message. Details are not repeated herein.

Optionally, the identifier of the BSS to which the first node belongs includes a BSS color. The identifier of the BSS to which the first node belongs is located in a duration field of the response message, and the duration field is located in the MAC header.

Figure 3:
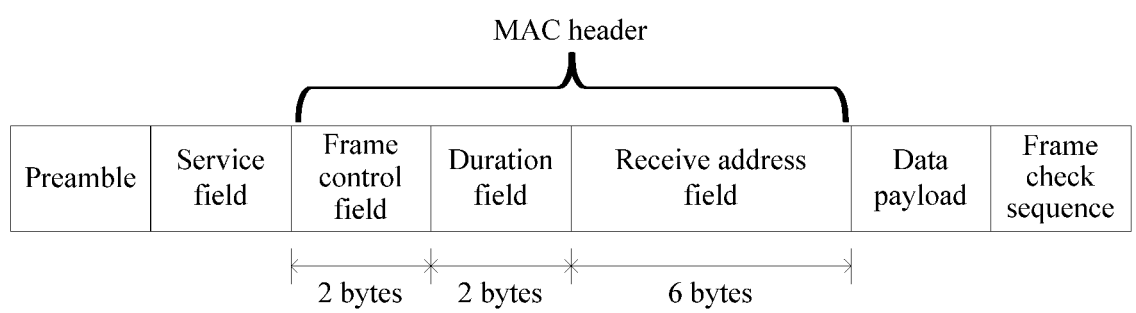
FIG. 3 is a schematic structural diagram of another wireless local area network frame according to Embodiment 2 of the present invention.

For example, Embodiment 2 of the present invention further provides another wireless local area network frame. FIG. 3 is a schematic structural diagram of another wireless local area network frame according to Embodiment 2 of the present invention. As shown in FIG. 3, the wireless local area network frame may include a preamble, a service field, a MAC header, a data payload, and an FCS. The MAC header includes a frame control (Frame Control) field, a duration (Duration) field, and a receive address (Receive Address, RA for short) field. The frame control field may be 2 bytes, that is, 16 bits. The duration field may be 2 bytes, that is, 16 bits. The RA field may be 6 bytes, that is, 48 bits.

For example, the identifier of the BSS to which the first node belongs may be located in the duration field, shown in FIG. 3, of the response message.

Optionally, the identifier of the BSS to which the first node belongs is located at a preset bit in the duration field of the response message.

Specifically, the identifier of the BSS to which the first node belongs is located at a lowest preset quantity of bits in the duration field of the response message, for example, four bits.

For example, the duration field of the response message may include one-bit indication information. If the indication information is 0, subsequent 15 bits are duration indicated by the first node. For example, the identifier of the BSS to which the first node belongs may be located at a lowest quantity of bits, that is, four bits, in the duration information in the duration field of the response message. If the duration field includes 16 bits: bits 0 to 15, and the bit 15 may be duration indication information, and if the bit 15 is 0, duration corresponding to the bits 0 to 14 is the duration indicated by the first node. The identifier of the BSS to which the first node belongs may be located at four bits: the bits 0 to 3.

It should be noted that the preset bit may alternatively be another quantity of bits, such as five bits or six bits. Details are not repeated herein.

Optionally, the response message further includes carried indication information. The carried indication information is located in a physical header or a MAC header of the response message. The carried indication information is used to indicate, to a third node, that the identifier of the BSS to which the first node belongs exists at the preset bit in the duration field of the response message.

Specifically, the physical header (Physical Header) of the response message may be the foregoing preamble of the wireless local area network frame shown in FIG. 2 or FIG. 3. The carried indication information may be located in a reserved field, a reusable field, or a newly-added field in the physical header or the MAC header of the response message. The carried indication information may be one bit or a plurality of bits.

For example, if the carried indication information is one bit, and the bit is 1, the carried indication information may be used to indicate, to the third node, that the identifier of the BSS to which the first node belongs exists at the preset bit in the duration field of the response message.

Figure 4:
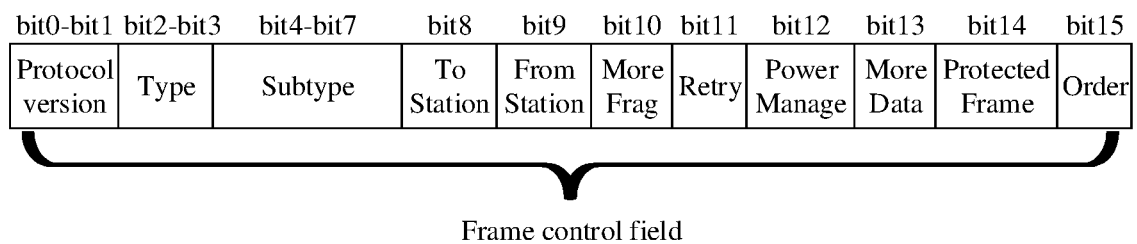
FIG. 4 is a schematic structural diagram of a frame control field according to Embodiment 2 of the present invention.

For example, the carried indication information may be located in a frame control field of the MAC header of the response message. FIG. 4 is a schematic structural diagram of a frame control field according to Embodiment 2 of the present invention. As shown in FIG. 4, the frame control field may include 16 bits: bits 0 to 15. The bit 0 and the bit 1 may be Protocol Version (Protocol Version), the bit 2 and the bit 3 may be Type (Type), the bits 4 to 7 may be Subtype (Subtype), the bit 8 may be To Distribution System (To Distribution System, To DS for short), the bit 9 may be From Distribution System (From DS), the bit 10 may be More Frag, the bit 11 is Retry (Retry), the bit 12 is Power Manage (Power Manage), the bit 13 is More Data, the bit 14 is Protected Frame (Protected Frame), and the bit 15 is Order (Order).

If the carried indication information is located in a frame control field of a MAC header of the response message, the carried indication information may be at any bit of the bits 8 to 15, except the bit 12 in the frame control field shown in FIG. 4. If the carried indication information is one-bit information, the carried indication information may be at any one of the bits 8 to 15, except the bit 12, in the frame control field shown in FIG. 4.

The carried indication information may further be a preset scramble seed (Scramble seed) or a preset bit of a scramble seed. The third node may determine a scramble seed of the first node based on a service field of the response message, and determines the carried indication information based on the scramble seed of the first node.

Alternatively, a result of comparing duration corresponding to the duration field of the response message with a preset threshold is used to indicate, to a third node that the identifier of the BSS to which the first node belongs exists at the preset bit in the duration field of the response message.

Specifically, if the comparison result is that the duration corresponding to the duration field of the response message is greater than or equal to the preset threshold, the comparison result is used to indicate, to a third node that the identifier of the BSS to which the first node belongs exists at the preset bit in the duration field of the response message.

Optionally, duration corresponding to a duration field of the request message is first duration.

Figure 5:
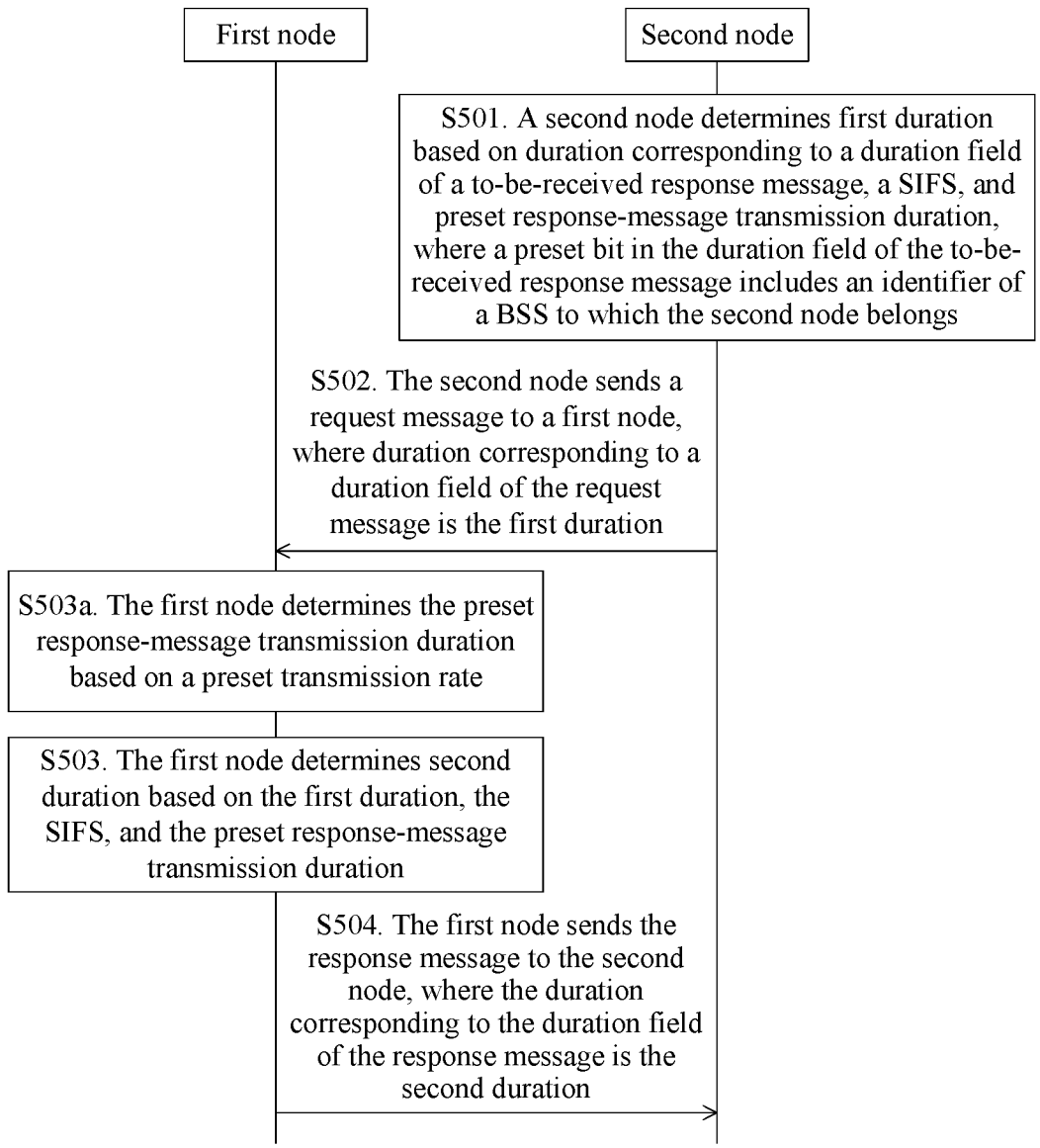
FIG. 5 is a flowchart of an information transmission method according to Embodiment 2 of the present invention.

FIG. 5 is a flowchart of an information transmission method according to Embodiment 2 of the present invention. As shown in FIG. 5, before step S101, in the method described in the foregoing embodiment, of receiving, by a first node, a request message sent by a second node, the method may further include the following steps.

S501. The second node determines first duration based on duration corresponding to a duration field of a to-be-received response message, a short interframe space (SIFS), and preset response-message transmission duration, where a preset bit in the duration field of the to-be-received response message includes an identifier of a BSS to which the second node belongs.

For example, the second node may determine the first duration based on a sum of the duration corresponding to the duration field of the to-be-received response message, the SIFS, and the preset response-message transmission duration.

S502. The second node sends the request message to the first node, where duration corresponding to a duration field of the request message is the first duration.

Optionally, before step S102 of sending, by the first node, a response message to the second node, the method further includes the following steps.

S503. The first node determines second duration based on the first duration, the SIFS, and the preset response-message transmission duration.

For example, the first node may determine the second duration based on duration obtained by successively subtracting the SIFS and the preset response-message transmission duration from the first duration.

S504. The first node sends the response message to the second node, where the duration corresponding to the duration field of the response message is the second duration.

Optionally, before step S503 of determining, by the first node, second duration based on the first duration, the SIFS, and the preset response-message transmission duration, the method further includes the following step.

S503a. The first node determines the preset response-message transmission duration based on a preset transmission rate.

The preset transmission rate is any one of a primary rate (Primary rate) of the first node, a rate corresponding to a modulation and coding scheme (Modulation and Coding Scheme, MCS for short) of the first node, and a rate corresponding to an MCS of the second node. The MCS of the second node may be determined by the first node based on the request message.

Specifically, the primary rate of the first node may be obtained in the following manner. A rate that is less than or equal to a rate of the request message is selected from a basic rate set (Basic Rate Set) corresponding to the BSS to which the first node belongs, and a maximum rate in rates less than or equal to the rate of the request message is used as the primary rate of the first node.

For example, the preset transmission rate may alternatively be a rate corresponding to a quantity of data flows of the first node.

Figure 6:
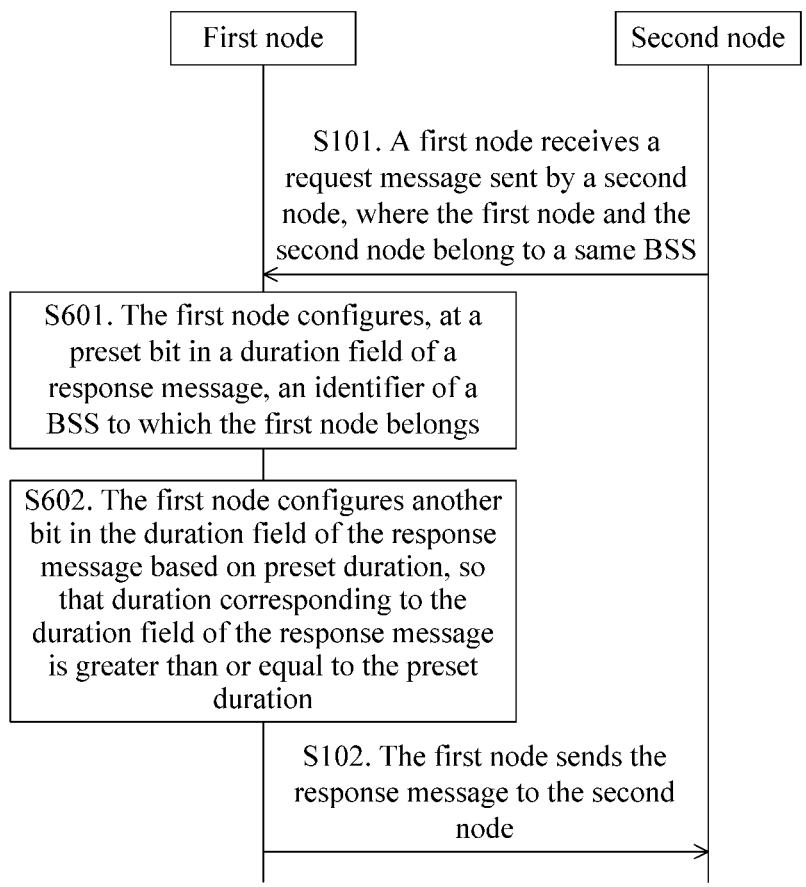
FIG. 6 is a flowchart of another information transmission method according to Embodiment 2 of the present invention.

FIG. 6 is a flowchart of another information transmission method according to Embodiment 2 of the present invention. As shown in FIG. 6, before step S102, in the method described in the foregoing embodiment, of sending, by the first node, a response message to the second node, the method may further include the following steps.

S601. The first node configures, at a preset bit in a duration field of the response message, an identifier of a BSS to which the first node belongs.

S602. The first node configures another bit in the duration field of the response message based on preset duration, so that duration corresponding to the duration field of the response message is greater than or equal to the preset duration.

For example, the identifier of the BSS to which the first node belongs is located in lowest four bits in the duration field of the response message, for example, bits 0 to 3. The first node may configure, at the bits 0 to 3 in the duration field of the response message, the identifier of the BSS to which the first node belongs, and configures another bit in the duration field of the response message, so that the duration corresponding to the duration field of the response message is greater than or equal to the preset duration. If the duration corresponding to the duration field of the response message is less than the preset duration, the first node may increase a value of the bit 4 by 1 to make the duration corresponding to the duration field of the response message be greater than or equal to the preset duration.

Figure 7:
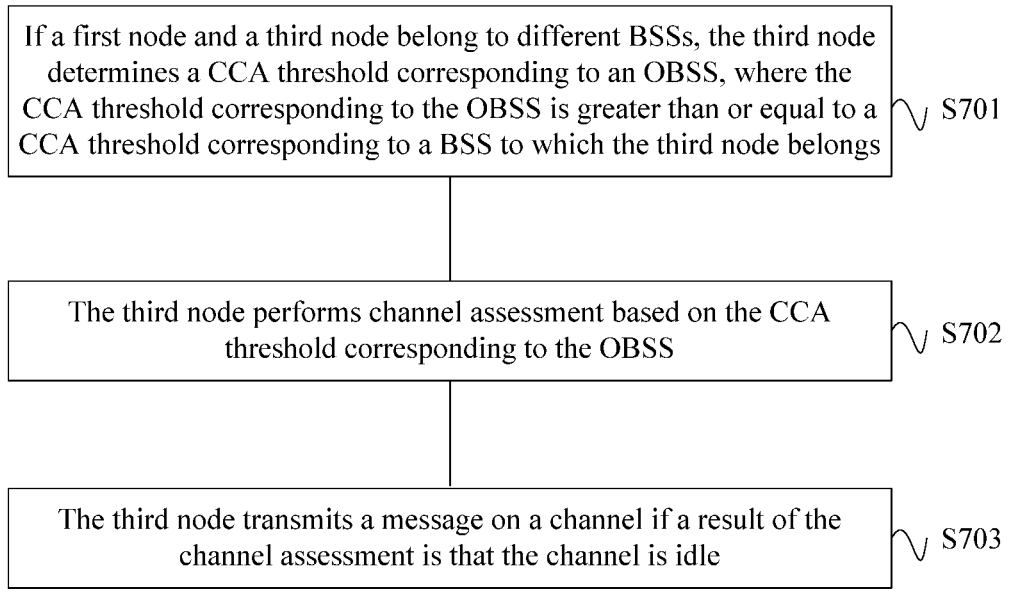
FIG. 7 is a flowchart of another information transmission method according to Embodiment 2 of the present invention.

FIG. 7 is a flowchart of another information transmission method according to Embodiment 2 of the present invention. As shown in FIG. 7, optionally, the method may further include the following steps.

S701. If the first node and the third node belong to different BSSs, the third node determines a CCA threshold corresponding to an OBSS, where the CCA threshold corresponding to the OBSS is greater than or equal to a CCA threshold corresponding to a BSS to which the third node belongs.

S702. The third node performs channel assessment based on the CCA threshold corresponding to the OBSS.

S703. The third node transmits a message on a channel if a result of the channel assessment is that the channel is idle.

Optionally, the response message further includes spatial reuse (SR) indication information.

Step S703 of transmitting, by the third node, a message on a channel if a result of the channel assessment is that the channel is idle includes transmitting, by the third node, the message on the channel if the result of the channel assessment is that the channel is idle and if the SR indication information is allowance indication information.

Optionally, the CCA threshold corresponding to the OBSS includes a packet detection (Packet Detection, PD for short) level (level) value corresponding to the OBSS. The CCA threshold corresponding to the BSS to which the third node belongs includes a PD level value corresponding to the BSS to which the third node belongs.

Specifically, for example, the CCA threshold corresponding to the BSS to which the third node belongs may include a minimum PD level value corresponding to the BSS to which the third node belongs, for example, −82 dBm.

Alternatively, the method may further include if the first node and the third node belong to a same BSS, respecting, by the third node, duration corresponding to the duration field of the response message, so that the third node does not need to perform channel assessment and skips transmitting information within the duration corresponding to the duration field of the response message.

Optionally, the request message may include a request to send (RTS) frame, and the response message may include a clear to send (CTS) frame.

Each information transmission method provided in Embodiment 2 of the present invention provides a plurality of solutions in which the identifier of the BSS to which the first node belongs is carried in the response message, so as to ensure that the third node can determine, based on the listened and detected message, the identifier of the BSS to which the first node belongs, and ensure that the third node more accurately differentiates BSSs to which nodes that send listened and detected signals belong. In this way, channel assessment accuracy, data transmission efficiency, and a network throughput are improved.

Figure 8:
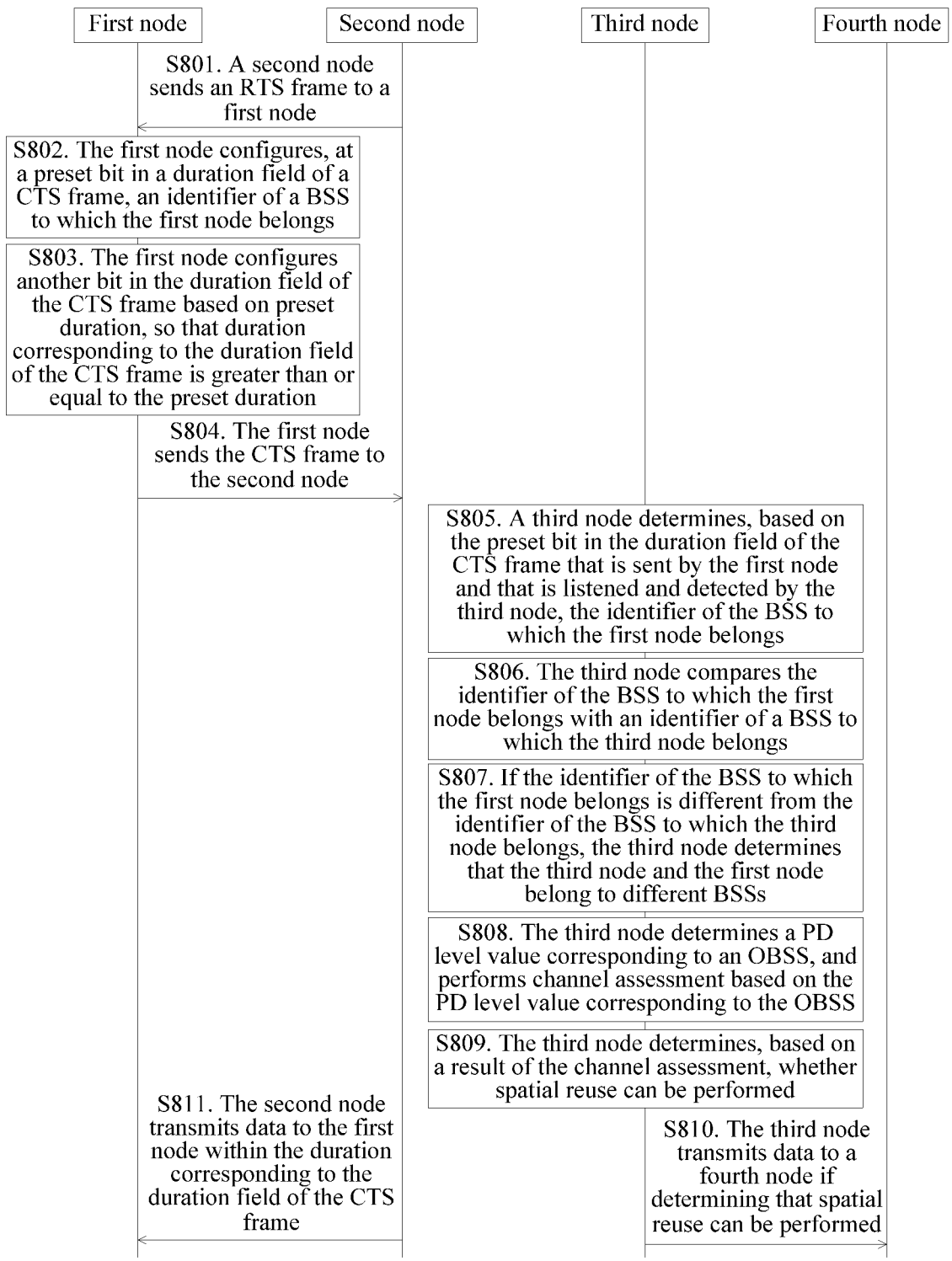
FIG. 8 is a flowchart of an information transmission method according to Embodiment 3 of the present invention.

Embodiment 3 of the present invention provides an information transmission method. FIG. 8 is a flowchart of an information transmission method according to Embodiment 3 of the present invention. The method provided in Embodiment 3 is applicable to two adjacent BSSs: a first BSS and a second BSS. A first node and a second node belong to the first BSS, that is, a BSS 1, and a third node and a fourth node belong to the second BSS, that is, a BSS 2.

As shown in FIG. 8, the method may include the following steps.

S801. The second node sends an RTS frame to the first node.

The second node may send the RTS frame to the first node when the second node needs to transmit data to the first node. The second node may be a station, and the first node may be an AP or a station.

For example, if the first node is an AP, the second node may send the RTS frame to the first node when the second node needs to transmit uplink data.

If the first node is a station, the second node may send the RTS frame to the first node when the second node needs to transmit D2D data.

S802. The first node configures, at a preset bit in a duration field of a CTS frame, an identifier of a BSS to which the first node belongs.

The identifier of the BSS to which the first node belongs includes a BSS color.

S803. The first node configures another bit in the duration field of the CTS frame based on preset duration, so that duration corresponding to the duration field of the CTS frame is greater than or equal to the preset duration.

S804. The first node sends the CTS frame to the second node.

S805. The third node determines, based on the preset bit in the duration field of the CTS frame that is sent by the first node and that is listened and detected by the third node, the identifier of the BSS to which the first node belongs.

Optionally, a frame control field of the CTS frame may include carried indication information, and before step S805, the method may further include determining, by the third node based on the carried indication information, that the identifier of the BSS to which the first node belongs exists at the preset bit in the duration field of the CTS frame.

Alternatively, before step S805, the method may further include comparing, by the third node, the duration corresponding to the duration field of the CTS frame with a preset threshold, if the duration corresponding to the duration field of the CTS frame is greater than or equal to the preset threshold, determining that the identifier of the BSS to which the first node belongs exists at the preset bit in the duration field of the CTS frame.

S806. The third node compares the identifier of the BSS to which the first node belongs with an identifier of a BSS to which the third node belongs.

S807. If the identifier of the BSS to which the first node belongs is different from the identifier of the BSS to which the third node belongs, the third node determines that the third node and the first node belong to different BSSs.

S808. The third node determines a PD level value corresponding to an OBSS, and performs channel assessment based on the PD level value corresponding to the OBSS.

S809. The third node determines, based on a result of the channel assessment, whether spatial reuse can be performed.

For example, when the result of the channel assessment is that a channel is idle, the third node may determine that spatial reuse can be performed.

If the third node is a conventional node, or if the result of the channel assessment is that a channel is busy, and spatial reuse cannot be performed, the third node may respect the duration corresponding to the duration field of the CTS frame, does not need to perform channel assessment, and skips transmitting information within the duration corresponding to the duration field of the CTS frame.

S810. The third node transmits data to the fourth node if determining that spatial reuse can be performed.

It should be noted that the third node may send an RTS frame to the fourth node, receive a CTS frame returned by the fourth node, and transmit data to the fourth node within duration corresponding to the CTS frame returned by the fourth node.

S811. The second node transmits data to the first node within the duration corresponding to the duration field of the CTS frame.

Figure 9A:
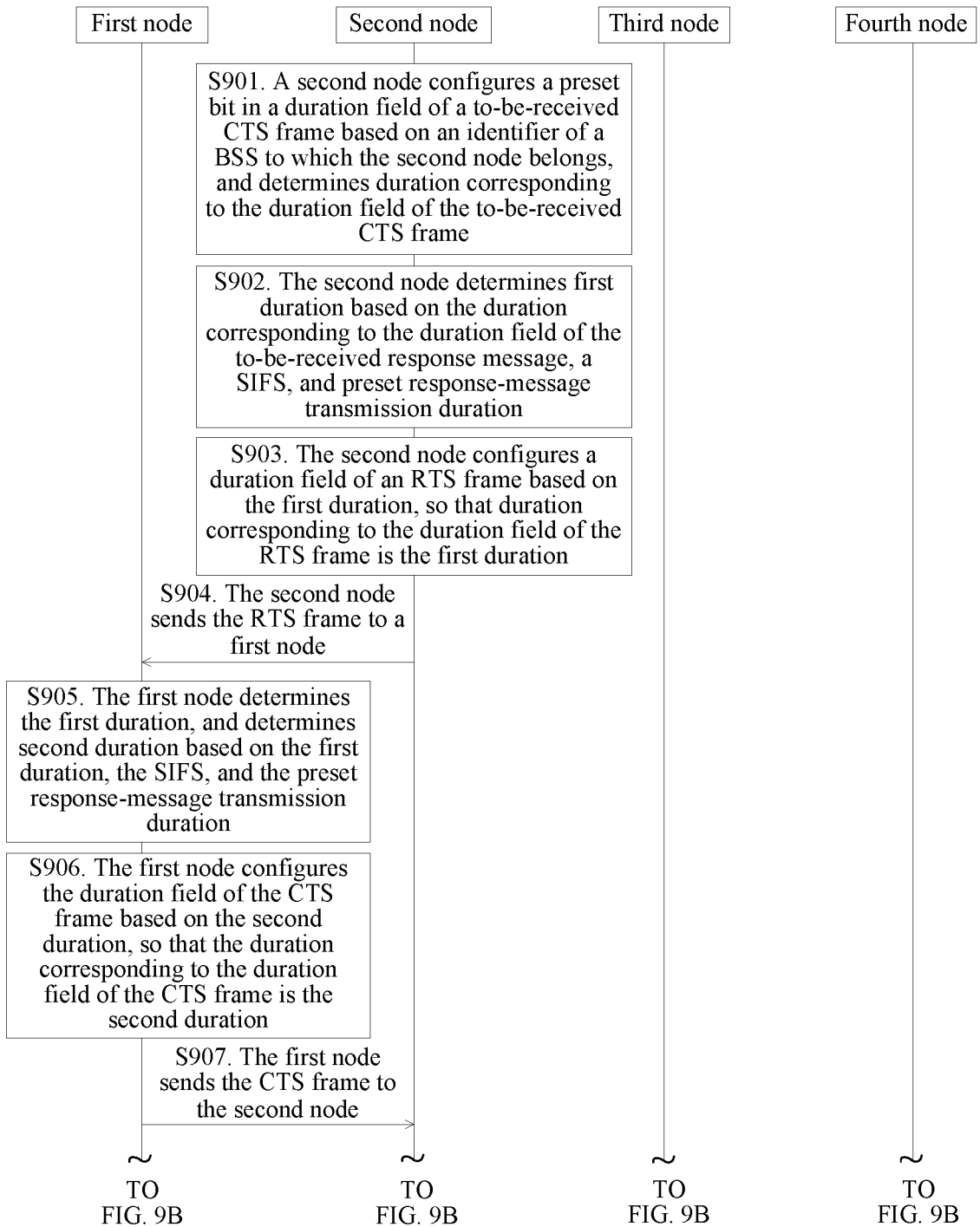
FIG. 9A and FIG. 9B are a flowchart of an information transmission method according to Embodiment 3 of the present invention.
Figure 9B:
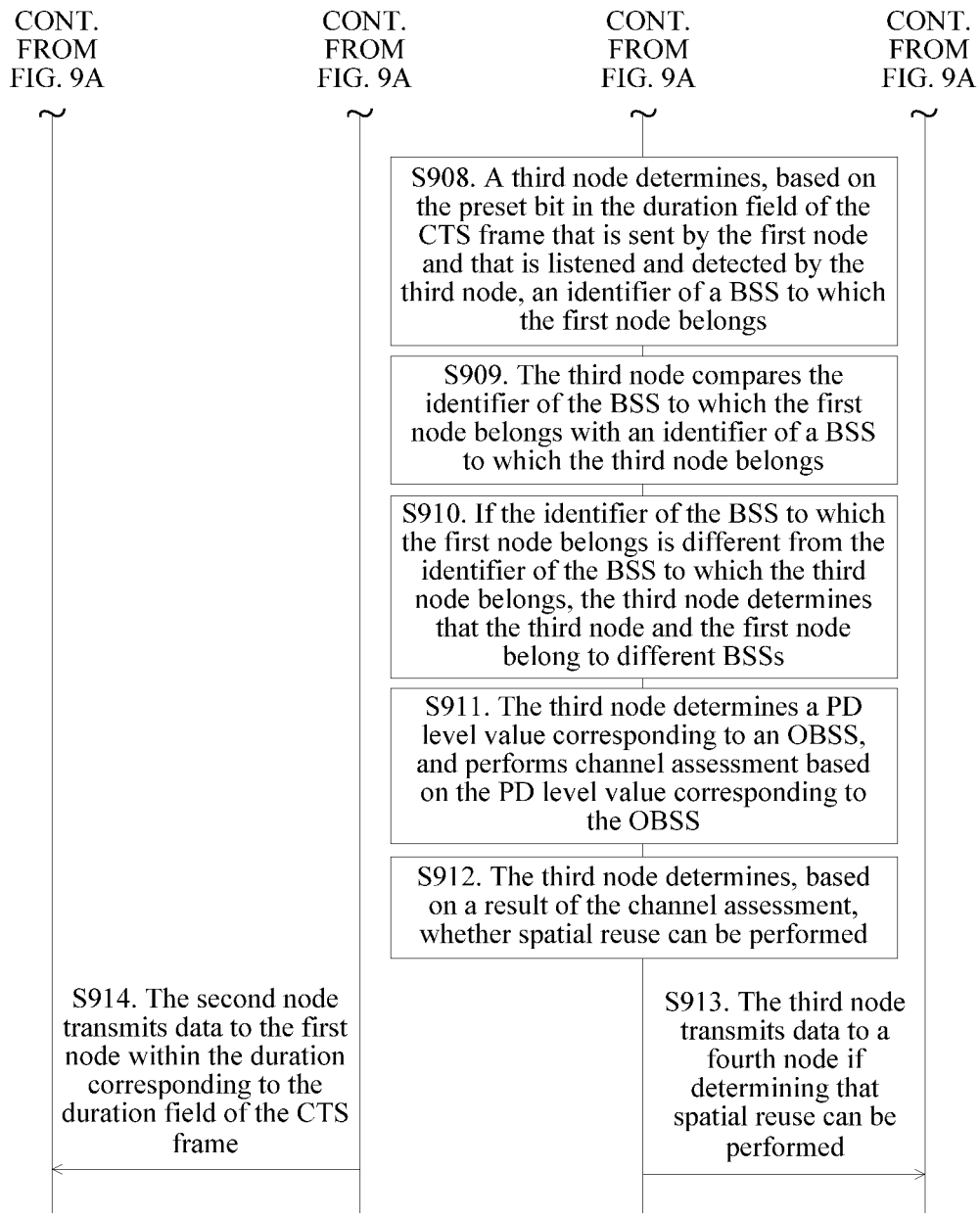

Embodiment 3 of the present invention further provides another information transmission method. FIG. 9A and FIG. 9B are a flowchart of an information transmission method according to Embodiment 3 of the present invention. As shown in FIG. 9A and FIG. 9B, the method may include the following steps.

S901. A second node configures a preset bit in a duration field of a to-be-received CTS frame based on an identifier of a BSS to which the second node belongs, and determines duration corresponding to the duration field of the to-be-received CTS frame.

S902. The second node determines first duration based on the duration corresponding to the duration field of the to-be-received CTS frame, a SIFS, and preset response-message transmission duration.

S903. The second node configures a duration field of an RTS frame based on the first duration, so that duration corresponding to the duration field of the RTS frame is the first duration.

S904. The second node sends the RTS frame to a first node.

S905. The first node determines the first duration, and determines second duration based on the first duration, the SIFS, and the preset response-message transmission duration.

S906. The first node configures the duration field of the CTS frame based on the second duration, so that the duration corresponding to the duration field of the CTS frame is the second duration.

S907. The first node sends the CTS frame to the second node.

S908. A third node determines, based on the preset bit in the duration field of the CTS frame that is sent by the first node and that is listened and detected by the third node, an identifier of a BSS to which the first node belongs.

Optionally, a frame control field of the CTS frame may include carried indication information, and before step S908, the method may further include determining, by the third node, based on the carried indication information, that the identifier of the BSS to which the first node belongs exists at the preset bit in the duration field of the CTS frame.

Alternatively, before step S908, the method may further include comparing, by the third node, the duration corresponding to the duration field of the CTS frame with a preset threshold, if the duration corresponding to the duration field of the CTS frame is greater than or equal to the preset threshold, determining that the identifier of the BSS to which the first node belongs exists at the preset bit in the duration field of the CTS frame.

S909. The third node compares the identifier of the BSS to which the first node belongs with an identifier of a BSS to which the third node belongs.

S910. If the identifier of the BSS to which the first node belongs is different from the identifier of the BSS to which the third node belongs, the third node determines that the third node and the first node belong to different BSSs.

S911. The third node determines a PD level value corresponding to an OBSS, and performs channel assessment based on the PD level value corresponding to the OBSS.

S912. The third node determines, based on a result of the channel assessment, whether spatial reuse can be performed.

For example, when the result of the channel assessment is that a channel is idle, the third node may determine that spatial reuse can be performed.

If the third node is a conventional node, or if the result of the channel assessment is that a channel is busy, and spatial reuse cannot be performed, the third node may respect the duration corresponding to the duration field of the CTS frame, does not need to perform channel assessment, and skips transmitting information within the duration corresponding to the duration field of the CTS frame.

S913. The third node transmits data to a fourth node if determining that spatial reuse can be performed.

It should be noted that the third node may send an RTS frame to the fourth node, receive a CTS frame returned by the fourth node, and transmit data to the fourth node within duration corresponding to the CTS frame returned by the fourth node.

S914. The second node transmits data to the first node within the duration corresponding to the duration field of the CTS frame.

The foregoing information transmission method can be applicable to an uplink data transmission scenario, or can be applicable to a D2D data transmission scenario.

Figure 10:
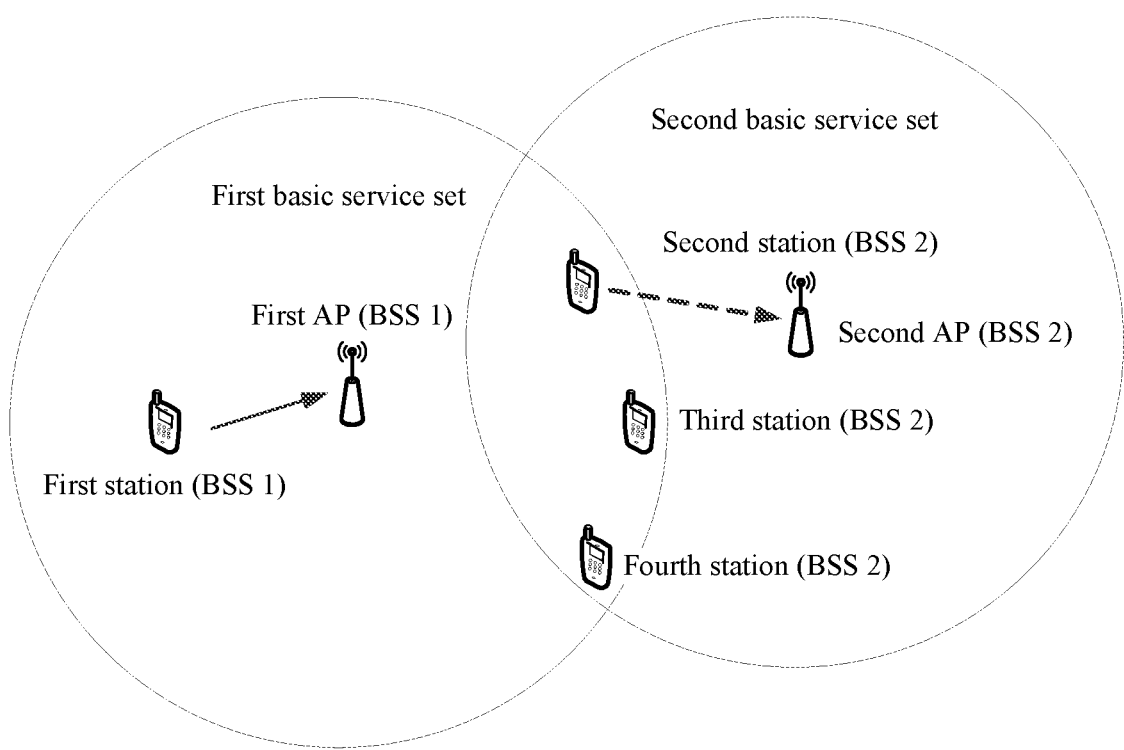
FIG. 10 is an architectural diagram of a network corresponding to uplink data transmission to which an information transmission method according to Embodiment 3 of the present invention is applicable.

For example, the foregoing information transmission method is applicable to the uplink data transmission scenario. FIG. 10 is an architectural diagram of a network corresponding to uplink data transmission to which an information transmission method according to Embodiment 3 of the present invention is applicable. As shown in FIG. 10, the information transmission method can be applicable to two adjacent BSSs: a first BSS and a second BSS. A first station and a first AP belong to the first BSS, and a second station, a third station, a fourth station, and a second AP belong to the second BSS. For example, the first node may be the first AP in FIG. 10, the second node may be the first station in FIG. 10, the third node may be any one of the second station, the third station, and the fourth station in FIG. 10, and the fourth node may be the second AP in FIG. 10.

Figure 11:
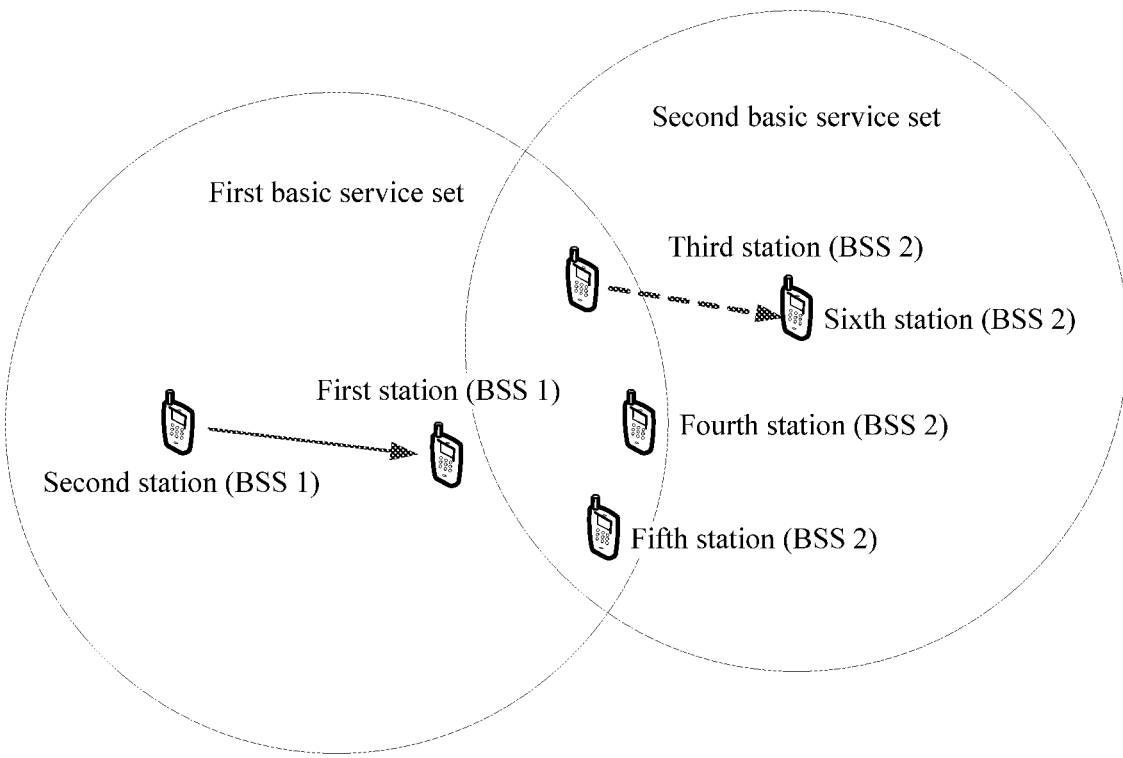
FIG. 11 is an architectural diagram of a network corresponding to D2D data transmission to which an information transmission method according to Embodiment 3 of the present invention is applicable.

For example, the information transmission method can be applicable to the D2D data transmission scenario. FIG. 11 is an architectural diagram of a network corresponding to D2D data transmission to which an information transmission method according to Embodiment 3 of the present invention is applicable. As shown in FIG. 11, the information transmission method can be applicable to two adjacent BSSs: a first BSS and a second BSS. A first station and a second station belong to the first BSS, and a third station, a fourth station, a fifth station, and a sixth station belong to the second BSS. For example, the first node may be the first station in FIG. 11, the second node may be the second station in FIG. 11, the third node may be any one of the third station, the fourth station, and the fifth station in FIG. 11, and the fourth node may be the sixth station in FIG. 11.

Embodiment 3 of the present invention provides a plurality of examples to describe each method of the foregoing embodiment in detail, and beneficial effects thereof are similar to those of the foregoing embodiment. Details are not repeated herein.

Figure 12:
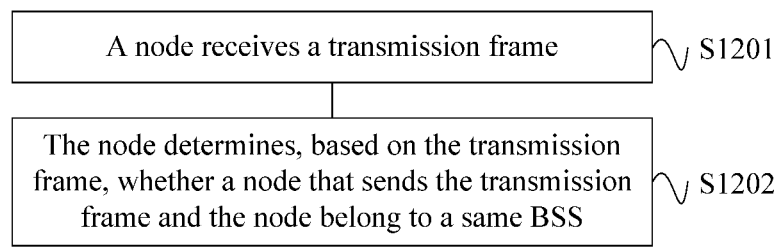
FIG. 12 is a flowchart of an information transmission method according to Embodiment 4 of the present invention.

Embodiment 4 of the present invention further provides an information transmission method. FIG. 12 is a flowchart of an information transmission method according to Embodiment 4 of the present invention. As shown in FIG. 12, the method may include the following steps.

S1201. A node receives a transmission frame.

The node may be a station or an AP. The transmission frame may include a physical layer convergence procedure protocol data unit (Physical layer convergence procedure Protocol Data Unit, PPDU for short).

S1202. The node determines, based on the transmission frame, whether a node that sends the transmission frame and the node belong to a same BSS.

Specifically, the node may determine, based on the PPDU, whether the node that sends the transmission frame and the node belong to a same BSS.

According to the information transmission method provided in Embodiment 4 of the present invention, the node determines, based on the received transmission frame, whether the node that sends the transmission frame and the node belong to a same BSS. In other words, according to the method, the node can differentiate BSSs to which nodes that send listened and detected signals belong, so as to perform channel assessment based on a differentiation result by using a corresponding CCA threshold. In this way, channel assessment accuracy, data transmission efficiency, and a network throughput are improved.

Figure 13:
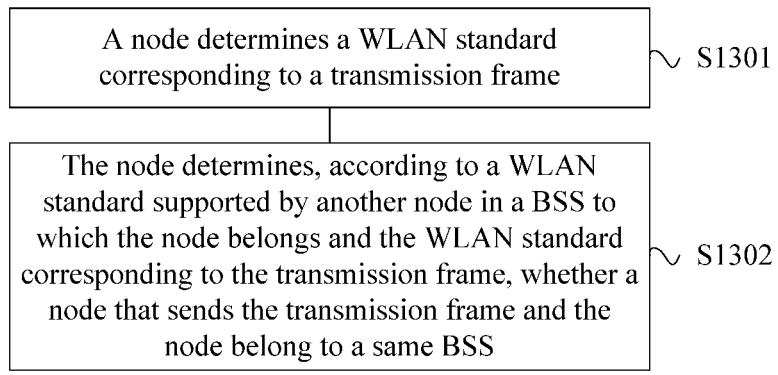
FIG. 13 is a flowchart of an information transmission method according to Embodiment 5 of the present invention.

Embodiment 5 of the present invention further provides an information transmission method. FIG. 13 is a flowchart of an information transmission method according to Embodiment 5 of the present invention. As shown in FIG. 13, in the method, step S1202 of determining, by the node based on the transmission frame, whether a node that sends the transmission frame and the node belong to a same BSS in the foregoing embodiment may include the following steps.

S1301. The node determines a WLAN standard corresponding to the transmission frame.

S1302. The node determines, according to a WLAN standard supported by another node in a BSS to which the node belongs and the WLAN standard corresponding to the transmission frame, whether the node that sends the transmission frame and the node belong to a same BSS.

The another node may be an associated node, of the node, in the BSS to which the node belongs. The associated node may be an AP.

Optionally, step S1302 of determining, by the node according to a WLAN standard supported by another node in a BSS to which the node belongs and the WLAN standard corresponding to the transmission frame, whether the node that sends the transmission frame and the node belong to a same BSS includes determining, by the node, whether the WLAN standard supported by the another node in the BSS to which the node belongs includes the WLAN standard corresponding to the transmission frame, and if the WLAN standard supported by the another node does not include the WLAN standard corresponding to the transmission frame, determining, by the node, that the node that sends the transmission frame and the node belong to different BSSs.

Specifically, the another node may be an associated node, of the node, in the BSS to which the node belongs.

For example, if the node is a station, an associated node, of the station, in a BSS to which the station belongs is an AP in the BSS to which the station belongs. If a WLAN standard supported by the station is the 802.11ax standard, the station may be referred to as a high efficiency (High Efficiency, HE for short) station.

If a WLAN standard supported by the AP is a conventional WLAN standard, the AP may be referred to as a conventional AP or a non-high efficiency (Non-High Efficiency, Non-HE for short) AP. If the WLAN standard corresponding to the transmission frame is the 802.11ax standard, the transmission frame may be referred to as an HE PPDU. Because the conventional WLAN standard does not include the 802.11ax standard, the Non-HEAP does not send an HE PPDU, and the station may determine that the node that sends the transmission frame and the station belong to different BSSs.

If a WLAN standard supported by the AP is the 802.11n standard, the AP may be referred to as a high throughput (High Throughput, HT for short) AP. If the WLAN standard corresponding to the transmission frame is the 802.11ax standard, a PPDU included in the transmission frame may be an HE PPDU. If the WLAN standard corresponding to the transmission frame is the 802.11ac standard, the transmission frame may be a very high throughput (Very High Throughput, VHT for short) PPDU. Because the 802.11n standard does not include the 802.11ax standard or the 802.11ac standard, the HT AP cannot send a transmission frame corresponding to the 802.11ax standard or the 802.11ac standard, that is, the HT AP cannot send a transmission frame that includes an HE PPDU or a VHT PPDU. Because the HT AP does not send an HE PPDU or a VHT PPDU, the station may determine that the node that sends the transmission frame and the station belong to different BSSs.

If a WLAN standard supported by the AP is the 802.11ac standard, the AP may be referred to as a VHT AP. If the WLAN standard corresponding to the transmission frame is the 802.11ax standard, a PPDU included in the transmission frame may be an HE PPDU. Because the 802.11ac standard does not include the 802.11ax standard, the VHT AP cannot send a transmission frame corresponding to the 802.11ax standard, that is, the VHT AP cannot send a transmission frame that includes an HE PPDU. Because the VHT AP does not send an HE PPDU, the station may determine that the node that sends the transmission frame and the station belong to different BSSs.

Optionally, the transmission frame may include WLAN standard indication information corresponding to the transmission frame, and the method further includes if the WLAN standard supported by the another node includes the WLAN standard corresponding to the transmission frame, determining, by the node based on the WLAN standard indication information, whether the WLAN standard corresponding to the transmission frame is the same as a WLAN standard supported by the node that sends the transmission frame, and if the WLAN standard corresponding to the transmission frame is different from the WLAN standard supported by the node that sends the transmission frame, determining, by the node, that the node that sends the transmission frame and the node belong to different BSSs.

Specifically, if the WLAN standard supported by the another node includes the WLAN standard corresponding to the transmission frame, the node further needs to determine, based on the WLAN standard indication information, whether the WLAN standard corresponding to the transmission frame is the same as the WLAN standard supported by the node that sends the transmission frame, so as to determine whether the node that sends the transmission frame is the another node. If the WLAN standard corresponding to the transmission frame is different from the WLAN standard supported by the node that sends the transmission frame, the node that sends the transmission frame is different from the another node, and the node may determine that the node that sends the transmission frame and the node belong to different BSSs.

The WLAN standard indication information corresponding to the transmission frame may be located in a reserved field or a reusable field in the transmission frame. For example, the WLAN standard indication information corresponding to the transmission frame may be located in a reserved field of a signal field in the transmission frame.

For example, if the WLAN standard supported by the another node, that is, the WLAN standard supported by the associated node, of the node, in the BSS to which the node belongs, such as an AP, is the 802.11ac standard, the AP is a VHT AP. If the WLAN standard corresponding to the transmission frame is the 802.11ac standard, the transmission frame may be a VHT PPDU. If the WLAN standard supported by the node that sends the transmission frame is the 802.11ax standard, the node that sends the transmission frame is an HE AP. Although the VHT AP can send a transmission frame corresponding to the 802.11ac standard, that is, a VHT PPDU, the node further needs to determine, based on the WLAN standard indication information, whether the WLAN standard corresponding to the transmission frame is the same as a latest WLAN standard supported by the node that sends the transmission frame, because the HE AP can also send a VHT PPDU. If the VHT PPDU is sent by the HE AP, the node may determine that the node that sends the transmission frame and the node belong to different BSSs. If the WLAN standard corresponding to the transmission frame is the 802.11ac standard, the WLAN standard indication information corresponding to the transmission frame may be located in a reserved field or a reusable field in the transmission frame, for example, in a reserved field of a very high throughput-signalfield (VHT-SIG)

If the WLAN standard supported by the another node, that is, the WLAN standard supported by the associated node, of the node, in the BSS to which the node belongs, such as an AP, is the 802.11n standard, the AP is an HT AP. If the WLAN standard corresponding to the transmission frame is the 802.11n standard, the transmission frame may be an HT PPDU. If the WLAN standard supported by the node that sends the transmission frame is the 802.11ax standard, the node that sends the transmission frame is an HE AP. Although the HT AP can also send a transmission frame corresponding to the 802.11n standard, that is, an HT PPDU, the node further needs to determine, based on the WLAN standard indication information, whether the WLAN standard corresponding to the transmission frame is the same as the WLAN standard supported by the node that sends the transmission frame, because the HE AP can also send an HT PPDU. If the HT PPDU is sent by the HE AP, the node may determine that the node that sends the transmission frame and the node belong to different BSSs. If the WLAN standard corresponding to the transmission frame is the 802.11n standard, the WLAN standard indication information corresponding to the transmission frame may be located in a reserved field or a reusable field in the transmission frame, for example, in a reserved field of a high throughput-signal field (HT-SIG).

If the WLAN standard supported by the another node, that is, the WLAN standard supported by the associated node, of the node, in the BSS to which the node belongs, such as an AP, is a conventional WLAN standard, the AP is a non-HT AP. If the WLAN standard corresponding to the transmission frame is a conventional WLAN standard, the transmission frame may include a non-HT PPDU. If the WLAN standard supported by the node that sends the transmission frame is the 802.11ax standard, the node that sends the transmission frame is an HE AP. Although the non-HT AP can also send a transmission frame corresponding to a conventional WLAN standard, that is, a non-HT PPDU, the node further needs to determine, based on the WLAN standard indication information, whether the WLAN standard corresponding to the transmission frame is the same as the WLAN standard supported by the node that sends the transmission frame, because the HE AP can also send a non-HT PPDU. If the non-HT PPDU is sent by the HE AP, the node may determine that the node that sends the transmission frame and the node belong to different BSSs. If the WLAN standard corresponding to the transmission frame is a conventional standard, the WLAN standard indication information corresponding to the transmission frame may be located in a reserved field or a reusable field in the transmission frame, for example, in a reserved field of a signal field.

Alternatively, if the transmission frame is a downlink transmission frame, the transmission frame may further include SR indication information.

Specifically, the SR indication information may be located in a reserved field or a reusable field in the transmission frame. For example, the SR indication information may be located in a reserved field of a signal field of the transmission frame.

Step S1202 of determining, by the node based on the transmission frame, whether a node that sends the transmission frame and the node belong to a same BSS may include determining, by the node based on the SR indication information, whether the node that sends the transmission frame and the node belong to a same BSS.

Optionally, the determining, by the node based on the SR indication information, whether the node that sends the transmission frame and the node belong to a same BSS includes if the SR indication information is allowance indication information, determining, by the node, that the node that sends the transmission frame and the node belong to different BSSs.

Alternatively, if the transmission frame is an uplink transmission frame, the transmission frame may further include a partial association identification (Partial Association Identification, PAID for short) corresponding to a node that receives the transmission frame.

Step S1302 of determining, by the node based on the transmission frame, whether a node that sends the transmission frame and the node belong to a same BSS may include determining, by the node based on the partial association identification corresponding to the node that receives the transmission frame and a partial association identification of the BSS to which the node belongs, whether the node that receives the transmission frame and the node belong to a same BSS, where the node that receives the transmission frame and the node that sends the transmission frame belong to a same BSS.

Specifically, if the transmission frame is an uplink transmission frame, the node that receives the transmission frame may be an AP, and the transmission frame may include a PAID corresponding to the AP.

Optionally, the determining, by the node based on the partial association identification corresponding to the node that receives the transmission frame and a partial association identification of the BSS to which the node belongs, whether the node that receives the transmission frame and the node belong to a same BSS includes comparing, by the node, the partial association identification corresponding to the node that receives the transmission frame and the partial association identification of the BSS to which the node belongs, and if a partial association identification corresponding to the node that receives the transmission frame is different from the partial association identification of the BSS to which the node belongs, determining, by the node, that the node that receives the transmission frame and the node belong to different BSSs.

Optionally, the method may further include if the node that receives the transmission frame and the node belong to different BSSs, determining, by the node, a CCA threshold corresponding to an OBSS, where the CCA threshold corresponding to the OBSS is greater than or equal to a CCA threshold corresponding to the BSS to which the node belongs, performing, by the node, channel assessment based on the CCA threshold corresponding to the OBSS, and transmitting, by the node, a message on a channel if a result of the channel assessment is that the channel is idle.

Optionally, if the transmission frame further includes SR indication information, the transmitting, by the node, a message on a channel if a result of the channel assessment is that the channel is idle may include transmitting, by the node, the message on the channel if the result of the channel assessment is that the channel is idle and if the SR indication information is allowance indication information.

Optionally, the CCA threshold corresponding to the OBSS includes a packet detection PD level value corresponding to the OBSS, and the CCA threshold corresponding to the BSS to which the node belongs includes a PD level value corresponding to the BSS to which the node belongs.

Alternatively, if the node is a station, and the associated node, of the node, in the BSS to which the node belongs is an AP, the method may further include determining, by the node, whether the transmission frame is an uplink transmission frame, if the transmission frame is an uplink transmission frame, determining, by the node, a CCA threshold corresponding to an OBSS, where the CCA threshold corresponding to the OBSS is greater than or equal to the CCA threshold corresponding to the BSS to which the node belongs, and performing, by the node, channel assessment based on the CCA threshold corresponding to the OBSS.

Specifically, if the transmission frame is an uplink transmission frame, the transmission frame is a non-D2D transmission frame.

For example, the node may determine, based on a group identification (Group Identification, Group ID for short) in the transmission frame, whether the transmission frame is an uplink transmission frame. If the Group ID is 0, the node may determine that the transmission frame is an uplink transmission frame, otherwise, if the Group ID is 63, the node may determine that the transmission frame is a downlink transmission frame.

Alternatively, the method may further include the following.

If the WLAN standard supported by the node is different from the WLAN standard supported by the associated node, of the node, in the BSS to which the node belongs, the node does not need to determine a CCA threshold corresponding to an OBSS, that is, the node cannot perform spatial reuse.

For example, if the WLAN standard supported by the node is the 802.11ax standard, the node is an HE station. If the WLAN standard supported by the associated node, of the node, in the BSS to which the node belongs, such as an AP, is not the 802.11ax standard, the AP is a non-HE AP. Because the WLAN standard supported by the HE station is different from the WLAN standard supported by the non-HE AP, the HE station cannot perform spatial reuse.

Embodiment 5 of the present invention further provides a plurality of information transmission methods in which a node determines, based on a transmission frame, whether a node that sends the transmission frame and the node belong to a same BSS, where the node is of different types. Therefore, it is bettered ensured that the node differentiates received signals from different nodes in BSSs, so as to perform channel assessment based on a differentiation result by using a corresponding CCA threshold. In this way, channel assessment accuracy, data transmission efficiency, and a network throughput are improved.

Figure 14:
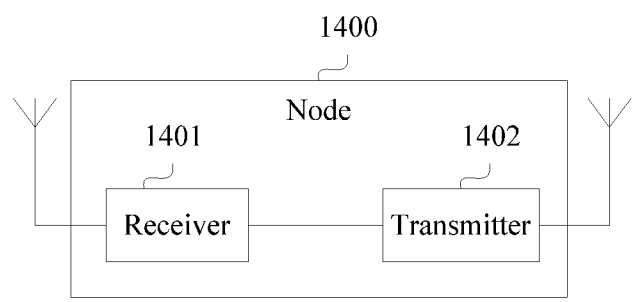
FIG. 14 is a schematic structural diagram of a node according to Embodiment 6 of the present invention.

Embodiment 6 of the present invention provides a node. FIG. 14 is a schematic structural diagram of a node 1400 according to Embodiment 6 of the present invention. As shown in FIG. 14, the node 1400 may include a receiver 1401 and a transmitter 1402. The node 1400 may be the first node described in any one of the foregoing embodiments.

The receiver 1401 is configured to receive a request message sent by a second node, where the first node and the second node belong to a same BSS.

The transmitter 1402 is configured to send a response message to the second node, where the response message includes an identifier of a BSS to which the first node belongs.

Optionally, the identifier of the BSS to which the first node belongs includes a BSS color, and the identifier of the BSS to which the first node belongs is located in a duration field of the response message.

Optionally, the identifier of the BSS to which the first node belongs is located at a preset bit in the duration field of the response message.

Optionally, the response message further includes carried indication information, and the carried indication information is used to indicate, to a third node, that the identifier of the BSS to which the first node belongs exists at the preset bit in the duration field of the response message.

Alternatively, a result of comparing duration corresponding to the duration field of the response message with a preset threshold is used to indicate, to a third node, that the identifier of the BSS to which the first node belongs exists at the preset bit in the duration field of the response message.

Optionally, duration corresponding to a duration field of the request message is first duration, the first duration is duration determined by the second node based on the duration corresponding to the duration field of the to-be-received response message, a short interframe space SIFS, and preset response-message transmission duration, and the preset bit in the duration field of the to-be-received response message includes an identifier of a BSS to which the second node belongs.

The node 1400 may further include a processor. The processor is configured to determine second duration based on the first duration, the SIFS, and the preset response-message transmission duration, where the duration corresponding to the duration field of the response message is the second duration.

Optionally, the processor is further configured to determine the preset response-message transmission duration based on a preset transmission rate.

Optionally, the processor is further configured to configure, at the preset bit in the duration field of the response message, the identifier of the BSS to which the first node belongs, and configure another bit in the duration field of the response message based on preset duration, so that the duration corresponding to the duration field of the response message is greater than or equal to the preset duration.

The node provided in Embodiment 6 of the present invention may perform an information transmission method performed by the first node described in any one of Embodiment 1 to Embodiment 5, and a specific implementation process and beneficial effects thereof are similar to those in the foregoing embodiments. Details are not repeated herein.

Figure 15:
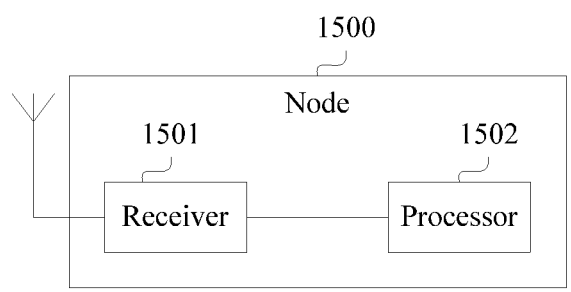
FIG. 15 is a schematic structural diagram of a node according to Embodiment 7 of the present invention.

Embodiment 7 of the present invention further provides a node. FIG. 15 is a schematic structural diagram of a node according to Embodiment 7 of the present invention. As shown in FIG. 15, the node 1500 may include a receiver 1501 and a processor 1502. The node 1500 may be a third node.

The receiver 1501 is configured to listen to a response message sent by a first node to a second node, where the response message includes an identifier of a BSS to which the first node belongs, and the first node and the second node belong to a same BSS.

The processor 1502 is configured to determine, based on the response message, the identifier of the BSS to which the first node belongs, and determine, based on the identifier of the BSS to which the first node belongs and an identifier of a BSS to which the third node belongs, whether the first node and the third node belong to a same BSS.

Optionally, the processor 1502 is further configured to compare the identifier of the BSS to which the first node belongs with the identifier of the BSS to which the third node belongs, and if the identifier of the BSS to which the first node belongs is different from the identifier of the BSS to which the third node belongs, determine that the first node and the third node belong to different BSSs.

Optionally, the identifier of the BSS to which the first node belongs includes a BSS color.

The processor 1502 is further configured to determine, based on a duration field of the response message, the identifier of the BSS to which the first node belongs.

Optionally, the processor 1502 is further configured to determine, based on a preset bit in the duration field of the response message, the identifier of the BSS to which the first node belongs.

Optionally, the response message further includes carried indication information.

The processor 1502 is further configured to determine, based on the carried indication information, whether the identifier of the BSS to which the first node belongs exists at the preset bit in the duration field of the response message, and if the identifier of the BSS to which the first node belongs exists at the preset bit, determine, based on the preset bit in the duration field of the response message, the identifier of the BSS to which the first node belongs.

Optionally, the processor 1502 is further configured to determine, based on a result of comparing duration corresponding to the duration field of the response message with a preset threshold, whether the identifier of the BSS to which the first node belongs exists at the preset bit in the duration field of the response message, and if the identifier of the BSS to which the first node belongs exists at the preset bit, determine, based on the preset bit in the duration field of the response message, the identifier of the BSS to which the first node belongs.

The node provided in Embodiment 7 of the present invention may perform an information transmission method performed by the third node described in any one of Embodiment 1 to Embodiment 5, and a specific implementation process and beneficial effects thereof are similar to those in the foregoing embodiments. Details are not repeated herein.

Persons of ordinary skill in the art may understand that all or some of the steps of the method embodiments may be implemented by using a program instructing relevant hardware. The program may be stored in a non-transitory computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An information transmission method, comprising:
receiving, by a first node, a request message sent by a second node, wherein the first node and the second node belong to a same basic service set (BSS); and
sending, by the first node, a response message to the second node, wherein the response message comprises a first identifier of a first BSS to which the first node belongs, wherein the first identifier is disposed in one or more first bits of a duration field of a header of the response message, wherein the first identifier of the first BSS to which the first node belongs comprises a BSS color, and wherein a first value for a first duration is disposed in one or more second bits of the duration field different from the one or more first bits, and wherein the first duration indicates a transmission duration for subsequent interaction between the first node and the second node;

wherein a relationship between a second duration corresponding to the one or more first bits and one or more second bits of the duration field of the response message to a preset threshold indicates whether the first identifier of the first BSS to which the first node belongs exists at a preset bit in the duration field of the response message, and wherein the preset bit in the duration field of the response message indicates, in response to the first identifier of the first BSS to which the first node belongs existing at the preset bit, the first identifier of the first BSS to which the first node belongs, and wherein the preset bit, the first duration and the second duration permit a third node to determine, according to the first identifier of the first BSS to which the first node belongs and a second identifier of a second BSS to which the third node belongs, whether the first node and the third node belong to a same BSS.

2. The method according to claim 1, wherein a duration corresponding to a duration field of the request message is a third duration, wherein the third duration is determined by the second node according to a duration value of the duration field of the response message, and further according to a short interframe space (SIFS) and a preset response-message transmission duration, wherein the preset bit in the duration field of the response message comprises an identifier of a BSS to which the second node belongs; and wherein the method further comprises:
    determining, by the first node before the sending the response message to the second node, a second duration based on the third duration, the SIFS, and the preset response-message transmission duration, wherein the second duration is a duration corresponding to the one or more first bits and one or more second bits of the duration field of the response message.

3. A node, comprising:
a receiver;
a transmitter;
a processor electrically connected to the receiver and to the transmitter; and
a non-transitory computer-readable storage medium storing a program to be executed by the processor, the program including instructions to:
    cause the receiver to receive a request message sent by a second node, wherein the node is a first node, and wherein the first node and the second node belong to a same basic service set (BSS); and
    cause the transmitter to send a response message to the second node, wherein the response message comprises a first identifier of a first BSS to which the first node belongs, wherein the first identifier is disposed in one or more first bits of a duration field of a header of the response message, wherein the first identifier of the first BSS to which the first node belongs comprises a BSS color and wherein a first value for a first duration is disposed in one or more second bits of the duration field different from the one or more first bits, and wherein the first duration indicates a transmission duration for subsequent interaction between the first node and the second node;

wherein a relationship between a second duration corresponding to the one or more first bits and one or more second bits of the duration field of the response message to a preset threshold indicates whether the first identifier of the first BSS to which the first node belongs exists at a preset bit in the duration field of the response message, and wherein the preset bit in the duration field of the response message indicates, in response to the first identifier of the first BSS to which the first node belongs existing at the preset bit, the first identifier of the first BSS to which the first node belongs, and wherein the preset bit, the first duration and the second duration permit a third node to determine, according to the first identifier of the first BSS to which the first node belongs and a second identifier of a second BSS to which the third node belongs, whether the first node and the third node belong to a same BSS.

4. The node according to claim 3, wherein a duration corresponding to a duration field of the request message is a third duration, wherein the third duration is determined by the second node according to a duration value of the duration field of the response message, and further according to a short interframe space (SIFS) and a preset response-message transmission duration, wherein the preset bit in the duration field of the response message comprises an identifier of a BSS to which the second node belongs; and wherein the program further includes instructions to determine a second duration based on the third duration, the SIFS, and the preset response-message transmission duration, wherein the second duration is a duration corresponding to the duration field of the response message.

5. The node according to claim 4, wherein the program further instructions to determine the preset response-message transmission duration according to a preset transmission rate.

6. The node according to claim 3, wherein the program further includes instructions to:
    configure, at the preset bit in the duration field of the response message, the first identifier of the BSS to which the first node belongs; and
    configure another bit in the duration field of the response message based on the preset duration and so that the duration corresponding to the duration field of the response message is greater than or equal to the preset duration.

7. A node, comprising:
a receiver;
a processor; and
a non-transitory computer-readable storage medium storing a program to be executed by the processor, the program including instructions to:
    cause the receiver to listen to a response message sent by a first node to a second node, wherein the node is a third node, wherein the response message comprises a first identifier of a first basic service set (BSS) to which the first node belongs, and wherein the first node and the second node belong to a same BSS, wherein the first identifier of the first BSS to which the first node belongs comprises a BSS color, wherein the first identifier is disposed in one or more first bits of a duration field of a header of the response message, and wherein a first value for a first duration is disposed in one or more second bits of the duration field different from the one or more first bits, and wherein the first duration indicates a transmission duration for subsequent interaction between the first node and the second node;

generate a comparison result by comparing a second duration corresponding to the one or more first bits and one or more second bits of the duration field of the response message with a preset threshold;

determine, according to the comparison result, whether the first identifier of the first BSS to which the first node belongs exists at a preset bit in the duration field of the response message;

determine, according to the preset bit in the duration field of the response message and in response to the first identifier of the first BSS to which the first node belongs existing at the preset bit, the first identifier of the first BSS to which the first node belongs; and determine, according to the first identifier of the first BSS to which the first node belongs and a second identifier of a second BSS to which the third node belongs, whether the first node and the third node belong to a same BSS.

8. The node according to claim 7, wherein the program further includes instructions to:

compare the first identifier of the first BSS to which the first node belongs with the second identifier of the second BSS to which the third node belongs; and determine that the first node and the third node belong to different BSSs in response to the first identifier of the first BSS being different from the second identifier of the second BSS.

* * * * *